United States Patent [19]

Weiss et al.

[11] Patent Number: 4,645,579

[45] Date of Patent: Feb. 24, 1987

[54] PREPARATION OF AQUEOUS HYDROXYLAMINE SOLUTIONS

[75] Inventors: Franz-Josef Weiss, Neuhofen; Wolfgang Habermann, Mainz; Peter Hammes, Ruppertsberg; Elmar Frommer, Ludwigshafen; Erwin Thomas, Freinsheim; Peter Thoma, Frankenthal, all of Fed. Rep. of Germany

[73] Assignee: BASF Aktiengesellschaft, Fed. Rep. of Germany

[21] Appl. No.: 685,254

[22] Filed: Dec. 24, 1984

[30] Foreign Application Priority Data

Dec. 28, 1983 [DE] Fed. Rep. of Germany ....... 3347259

[51] Int. Cl.$^4$ .............................................. B01D 13/02
[52] U.S. Cl. ................................. 204/182.4; 204/101; 204/102; 204/182.5
[58] Field of Search .................... 204/101, 102, 180 P, 204/182.4, 182.5, 72

[56] References Cited

U.S. PATENT DOCUMENTS

| | | | |
|---|---|---|---|
| 2,363,387 | 11/1944 | Bock | 204/72 |
| 2,737,486 | 3/1956 | Bodamer | 204/72 |
| 3,402,115 | 9/1968 | Campbell et al. | 204/72 X |
| 3,766,038 | 10/1973 | Beck et al. | 204/180 P |
| 4,521,285 | 6/1985 | De Witt et al. | 204/182.4 X |

OTHER PUBLICATIONS

*Chemical Abstracts*, vol. 102, 1985, abstract No. 134403s, Stamicarbon, B. V., "Circulating Process for Preparing and Working Up a Hydroxylammonium Salt Solution".

*Chemical Abstracts*, vol. 94, 1981, abstract No. 141,981y, Chang, Y. et al, "Conversion of Hydroxylamine Hydrochloride to Hydroxylamine Nitrate by Electrodialysis and Water Splitting".

*Chemical Abstracts*, vol. 83, 1975, abstract No. 181595e, Maurel, A., "Continuous Transformation of a Hydroxylamine Salt into Another Hydroxylamine Salt".

Y. Chang et al., "Chemical Abstracts", Band 94, (1981), p. 134.

*Primary Examiner*—John F. Niebling
*Attorney, Agent, or Firm*—Keil & Weinkauf

[57] ABSTRACT

Aqueous solutions of hydroxylamine are prepared from aqueous hydroxylammonium salt solutions by electrodialysis by a method in which the aqueous hydroxylammonium salt solution is fed into the middle zone of an electrolysis cell, which is divided into a cathode zone, an anode zone and a middle zone by means of semipermeable membranes, and is electrolyzed, and the catholyte used is an alkali metal hydroxide solution containing ammonia and/or amines.

8 Claims, No Drawings

PREPARATION OF AQUEOUS HYDROXYLAMINE SOLUTIONS

Hydroxylamine is produced industrially in the form of its salts, for example by catalytic reduction of nitric oxide or nitric acid. In the further conversion of the hydroxylammonium salts, for example to oximes, the corresponding anions are liberated in the form of acids, but it is often difficult to remove such foreign anions from the reaction mixture again. If, on the other hand, free hydroxylamine is prepared by reacting a hydroxylammonium salt with an alkali, the foreign anions cannot be removed completely in this case either. A process has also been disclosed in which the anions are removed by electrodialysis. According to the processes described in German Laid-Open Application DOS No. 2,062,436, an aqueous solution of hydroxylammonium sulfate is subjected to electrolysis in the presence of cyclohexanone, cyclohexanone oxime being formed. Because of the instability of the hydroxylamine and the short life of the semipermeable membranes, this procedure is not very suitable for the preparation of aqueous solutions of hydroxylamine.

It is an object of the present invention to provide a process for the preparation of aqueous solutions of hydroxylamine which gives high yields and produces aqueous hydroxylamine solutions having a very low content of anions.

We have found that this object is achieved by a process for the preparation of aqueous solutions of hydroxylamine from an aqueous hydroxylammonium salt solution by electrodialysis, the aqueous hydroxylammonium salt solution being fed into the middle zone of an electrolysis cell which is divided into a cathode zone, an anode zone and a middle zone by means of semipermeable membranes, and being electrolyzed, wherein the catholyte used is an aqueous alkali metal hydroxide solution containing ammonia and/or amines.

The novel process has the advantages that it takes place with high yields, the decomposition of the hydroxylamine is suppressed, the semipermeable membranes, in particular for the cathode space, have a fairly long life, and aqueous hydroxylamine solutions having a very low content of anions, e.g. <10 ppm, can be prepared.

According to the invention, aqueous solutions of hydroxylammonium salts are used as starting materials, particularly suitable hydroxylammonium salts being those of oxyacids, such as sulfuric acid, nitric acid, phosphoric acid and carboxylic acids, e.g. acetic acid or propionic acid. Hydroxylammonium sulfate and phosphate solutions have become particularly important industrially. As a rule, 5–30% strength by weight aqueous hydroxylammonium salt solutions are used. In the preparation of highly concentrated, i.e. >25% strength by weight, hydroxylamine solutions, the hydroxylammonium sulfate consumed is supplemented until the desired hydroxylamine concentration is reached. To avoid dilution effects as a result of osmosis, comoounds which increase the osmotic pressure are added to the catholyte in this procedure. Suitable compounds are low molecular weight water-soluble compounds which are inert under the reaction conditions, e.g. sugar or urea or its derivatives. Advantageously, the hydroxylammonium salt solutions used contain less than 1 ppm of metal ions of sub-groups 1, 2, 5, 6, 7 and 8 of the Periodic Table.

The electrolysis is carried out in a cell which is divided into a cathode zone, an anode zone and a middle zone by means of two semipermeable membranes. The aqueous hydroxylammonium salt solution being electrolyzed is introduced into the middle zone. The anolyte used in the anode zone is, as a rule, an aqueous solution of an oxyacid, in particular one which corresponds to the anion of the hydroxylammonium salt solution used. Advantageously, the aqueous solutions employed contain from 0.1 to 50% by weight of the oxyacid. A particularly good current efficiency is achieved if, instead of an aqueous acid solution, an aqueous solution of an alkali metal hydroxide, e.g. sodium hydroxide, an alkali metal carbonate, e.g. sodium carbonate or an alkaline earth metal hydroxide, e.g. calcium hydroxide, is used.

According to the invention, the catholyte used in the cathode zone is an aqueous alkali metal hydroxide solution which contains ammonia and/or amines. Examples of suitable solutions are aqueous solutions of lithium hydroxide, sodium hydroxide and potassium hydroxide, the two last-mentioned compounds preferably being used. Advantageously, the catholyte contains from 0.1 to 25, in particular from 1 to 10, % by weight of alkali metal hydroxides. Aqueous solutions of tetraalkylammonium hydroxides, e.g. tetraethylammonium hydroxide, are also suitable. The alkali metal hydroxide solutions contain, for examole, from 0.001 to 50, preferably from 0.02 to 10, in particular from 0.05 to 0.8, % by weight of ammonia and/or amines. Suitable amines are primary, secondary or tertiary amines, for example those which possess alkyl radicals of 1 to 4 carbon atoms at the nitrogen atom, which can furthermore have a hydroxyl or alkoxy group as a substituent, e.g. tripropylamine, tributylamine, dipropylamine, n-propylamine, dibutylamine, isobutylamine, 2-methoxyethylamine, 3-methoxypropylamine, ethanolamine, diethanolamine or methoxymethylamine. Cyclic amines, such as aminoethyl-morpholine, aminoethylpyrrolidine or cyclohexylamine, and polyamines obtainable by reacting amines with ethyleneimine are also suitable.

The electrolysis is advantageously carried out using a current density of from 0.1 to 10, in particular from 1 to 3.5, $kA/m^2$. Advantageously, the temperature is kept at from 10° to 40° C., preferably from 15° to 28° C. during this procedure.

Advantageously used cathodes are corrosion-resistant materials having a low hydrogen overvoltage, e.g. stainless steels, chromium nickel steels, nickel, nickel-iron alloys containing from 65 to 95% by weight of iron, or iron coated with nickel-iron alloys, but preferably graphite or alkali-resistant titanium or zirconium alloys, such as titanium-iron, titanium-nickel, zirconium-iron or zirconium-nickel. Examples of suitable anode materials are titanium, tantalum, niobium or niobium-tantalum alloys which are doped at the surface with platinum metals, platinum metal oxides or, preferably, platinates and have a low oxygen overvoltage. The latter should be less than 300 mV at 1 $kA/m^2$.

Advantageously, the electrolysis is carried out in the absence of molecular oxygen in the middle zone. The content of molecular oxygen should not exceed 20 ppm.

It has also proven advantageous if the aqueous hydroxylammonium salt solution being electrolyzed contains a stabilizer. Examples of suitable stabilizers are 8-hydroxyquinaldine, flavones, such as morin, hydroxyquinolines, such as 8-hydroxyquinoline, anthocyanidines, such as cyanidinium chloride and hydroxyanthraquinones, such as quinalizarine, which, if required, are used in combination with polyhydroxyphenols such as pyrogallol. Other suitable stabilizers are quercetin, benzonitrile, benzamidoxime, isocyanates, N-phenyl-N-hydroxythiourea, reductones and/or reductonates, e.g. 2,3-didehydrohexono-1,4-lactone, and alkali metal salts of ethylenediaminetetraacetic acid. The concentration of stabilizers is advantageously from $5.10^{-4}$ to 1, in particular from $5.10^{-3}$ to $5.10^{-2}$, % by weight, based on the hydroxylammonium salt. Stabilizers which form chelates with metal ions have proven particularly useful.

In the electrolysis cell, it is preferable to use semipermeable membranes which have a weakly basic reaction at least on the side facing the middle zone. Examples of suitable membranes are anion exchange membranes possessing weakly basic groups, such as polymeric amines or polymers or copolymers which contain a primary, secondary or tertiary amine, e.g. of the R—$NH_2$, R—$NH(CH_3)$, or in particular R—$N(CH_3)_2$ type, as charge-carrying groups. Particularly suitable carriers for the ion exchange groups are polystyrene/divinylbenzenecopolymers containing from 4 to 16, in particular from 6 to 8, % by weight of divinylbenzene.

Examples of other suitable weakly basic membranes are those which consist of hydrogenated styrene/butadiene block copolymers, polybutadiene, polyisoprene, polyisobutylene or polyethylene and contain finely divided titanium oxide hydroxide, zirconium oxide hydroxide, kaolinite, montmorillonite, apatite, synthetic hydroxylapatite, magnesium oxide hydroxide, aluminum oxide hydroxide or aluminum/zirconium oxide hydroxide in amounts of from 40 to 70% by weight. Titanium oxide hydroxide, zirconium oxide hydroxide, synthetic hydroxylapatite or zirconium aluminum oxide hydroxide is preferably used.

It is also possible to coat membranes with the above-mentioned weakly basic agents, with or without a binder, such as hydrogenated styrene/butadiene block copolymers, polyethylene, polypropylene or polybutadiene. The weakly basic layer is produced by incorporating the said agent into the thermoplastic binder on a roll mill, or by applying binders dissolved in organic solvents finely dispersed in water, e.g. latex dispersions of polyisobutylene, polybutadiene or polyisoprene, which contain weakly basic agents, onto the membranes.

Polymeric membrane layers, e.g. of vinyl chloride and/or acrylonitrile, which contain, in particular, from 40 to 75% by weight of polymeric tertiary amines having a molecular weight >250, in particular >500, are also suitable. In coating the membrane, both polymers are used in solution, for example in dimethylformamide or dimethylsulfoxide, and the coating is then dried.

The aqueous hydroxylamine solutions obtainable by the process of the invention are useful for the preparation of oximes.

The Examples which follow illustrate the process illustrate the process according to the invention.

EXAMPLE 1

An electrodialysis cell divided into three compartments is provided with 2 anion exchange membranes, each having an electrode surface of 1 $dm^2$. The anion exchange membranes consist of a styrene/divinylbenzene copolymer which contains 8% of divinylbenzene, and quaternary ammonium groups as charge carriers. 0.1 mm thick layers consisting of 65 vol. % of zirconium oxide hydroxide and 35 vol. % of polyisobutylene are applied on the membrane surfaces which separate the middle compartment from the anode and cathode spaces. The anode space contains a titanium grid electrode which has an area of 1 $dm^2$ and is doped at the surface with platinates of the type $Li_{0.3}Pt_3O_4$. The cathode has an area of 1 $dm^2$ and consists of nickel. The catholyte used is a 5% strength aqueous sodium hydroxide solution containing 0.1% of dibutylamine, while the anolyte employed is 4% strength by weight aqueous sulfuric acid. In the middle compartment of the electrodialysis cell, 1500 g of 25% strength by weight aqueous hydroxylammonium sulfate solution containing 100 ppm of morin are circulated at $+25°$ C. At a current density of 20 A/$dm^2$ and an initial cell voltage of 6 V, an aqueous hydroxylamine solution containing <20 ppm of sulfate is obtained after 285 Ah. The material yield is ~99%, based on hydroxylammonium sulfate employed, and the current efficiency is ~52%, based on sulfate. If, instead of aqueous sulfuric acid, 5% strength by weight aqueous sodium carbonate solution is used as the anolyte, the current efficiency is ~90%.

EXAMPLE 2

An electrodialysis cell divided into three compartments and having the same dimensions as in Example 1 is provided with two anion exchange membranes which consist of a styrene/divinylbenzene copolymer which contains ~6% of divinylbenzene, and quaternary ammonium groups as charge carriers. The surface of the membranes on the side facing the middle compartment is coated with a 0.02 mm thick layer of a styrene copolymer containing tertiary amino groups of the R—N—$(CH_3)_2$ type. The cathode used is a titanium-iron alloy containing 18% by weight of iron, and the anode employed is a platinate-doped titanium electrode. The catholyte consists of 5% strength by weight aqueous sodium hydroxide solution containing 5% of ammonia, and the anolyte consists of 10% strength by weight aqueous sulfuric acid. In the middle compartment of the electrodialysis cell, 1500 g of 25% strength by weight aqueous hydroxylammonium sulfate solution containing 100 ppm of 8-hydroxyquinoline are circulated and electrolyzed. At a current density of 20 A/$dm^2$ and an initial cell voltage of 5.8 V, an aqueous hydroxylamine solution containing <20 ppm of sulfate is obtained after 287 Ah at $+23°$ C. The material yield is ~98.8%, based on hydroxylammonium sulfate employed, and the current efficiency is ~50%, based on sulfate.

EXAMPLE 3

In an electrodialysis cell which is divided into three compartments and has the dimensions stated in Example 1, the cathode space is separated from the middle compartment by a membrane which consists of a hydrogenated styrene/butadiene block copolymer containing 50 vol. % of zirconium oxide hydroxide, and the anode space is separated from the middle chamber by a membrane which consists of a styrene/divinylbenzene copolymer which contains ~12% by weight of divinylbenzene and also contains quaternary ammonium groups. The cathode used is a zirconium-nickel alloy containing 15% by weight of nickel, and the anode employed is a platinate-activated titanium electrode. The catholyte consists of 5% strength by weight aqueous potassium hydroxide solution, and the anolyte consists of 10% strength by weight aqueous sulfuric acid. In the middle chamber, 1500 g of a 25% strength by weight aqueous hydroxylammonium sulfate solution containing 200 ppm of quercetin are circulated. At a current density of 25 A/dm² and an initial cell voltage of 6.1 V, an aqueous hydroxylamine solution containing <100 ppm of sulfate is obtained after 280 Ah at +26° C. The material yield is ~98.2%, based on hydroxylammonium sulfate used, and the current efficiency is ~53%.

EXAMPLE 4

An electrodialysis cell which is divided into three compartments and has the dimensions as stated in Example 1 is provided with two anion exchange membranes which consist of a styrene/divinylbenzene copolymer containing ~6% of divinylbenzene and possess quaternary ammonium groups as charge carriers. The cathode used is a titanium-iron alloy containing 20% by weight of iron, and the anode employed is a platinate-doped titanium electrode. The catholyte consists of 5% strength by weight aqueous sodium hydroxide solution containing 1.5% by weight of added dibutylamine, and the anolyte consists of 5% strength by weight aqueous sulfuric acid. In the middle compartment, 1500 g of 25% strength by weight aqueous hydroxylammonium sulfate solution containing 200 ppm of 8-hydroxyquinaldine are circulated and electrolyzed at a current density of 20 A/dm². Electrolysis is complete after ~275 Ah. The material yield is ~97.2%, based on hydroxylammonium sulfate used, and the current efficiency is ~50%, based on sulfate. The residual sulfate content is <10 ppm.

If no stabilizer is employed in the hydroxylamine solution, and dibutylamine is not added to the alkali metal hydroxide solution, the material yield is ~79%, based on hydroxylammonium sulfate used.

EXAMPLE 5

An electrolysis cell which is divided into three compartments and has the dimensions stated in Example 1 is provided with two anion exchange membranes which consist of a styrene/divinylbenzene copolymer which contains quaternary ammonium groups as charge-carrying groups. The anion exchange membrane which separates the cathode space from the middle compartment is cross-linked with 6% by weight of divinylbenzene, and the membrane used to separate the anode space from the middle compartment contains 8% by weight of divinylbenzene as the copolymer. The cathode used is a zirconium-nickel alloy containing 60% by weight of nickel, and the anode employed is a platinate-activated titanium anode. The catholyte consists of 5% strength aqueous sodium hydroxide solution containing 3% by weight of dibutylamine, and the anolyte consists of 2% strength by weight aqueous sulfuric acid. In the middle compartment, 1500 g of a 25% strength by weight aqueous hydroxylammonium sulfate solution are employed without a stabilizer, the solution being circulated at +25° C. At a current density of 20 A/dm² and an initial cell voltage of 6 V, an aqueous hydroxylamine solution containing less than 15 ppm of sulfate is obtained after 250 Ah. The material yield is ~96.5%, based on hydroxylammonium sulfate used, and the current efficiency is ~54%, based on sulfate.

If 5% strength aqueous sodium hydroxide solution without dibutylamine is used as the catholyte, the material yield is ~78%, based on hydroxylammonium sulfate used.

We claim:

1. A process for the preparation of an aqueous solution of hydroxylamine from an aqueous hydroxylammonium salt solution by electrodialysis, the aqueous hydroxylammonium salt solution being fed into the middle zone of an electrolysis cell having anion selective membranes which is divided into a cathode zone, an anode zone and a middle zone by means of semipermeable membrances, and being electrolyzed, wherein the catholyte used is an aqueous alkali metal hydroxide solution containing a member selected from the group consisting of ammonia, primary, secondary or tertiary amines which possess alkyl radicals of 1 to 4 carbon atoms at the nitrogen atom which can have a hydroxy or alkoxy group as a substitutent, cyclic amines and polyamines obtainable by reacting amines with ethylene imine, or mixtures thereof.

2. A process as claimed in claim 1, wherein the content of molecular oxygen in the middle zone is less than 20 ppm.

3. A process as claimed in claim 1, wherein the hydroxylammonium salt solution used contains a stabilizer which forms a chelate with metal ions for hydroxylamine.

4. A process as claimed in claim 1, wherein the hydroxylammonium salt solution used contains less than 1 ppm of heavy metals.

5. A process as claimed in claim 1, wherein the catholyte contains from 0.001 to 50% by weight of a member selected from the group consisting of ammonia, amines or mixtures thereof.

6. A process as claimed in claim 1, wherein the semipermeable membrances are weakly basic, at least on the sides which face the middle zone.

7. A process as claimed in claim 6, wherein the semipermeable membrances contain weakly basic ion exchangers.

8. A process as claimed in claim 6, wherein the semipermeable membrances contain zirconium oxide hydroxide, titanium oxide hydroxide, synthetic hydroxylapatite or zirconium aluminum oxide hydroxide, or a mixture of these.

* * * * *